(12) United States Patent
Oster

(10) Patent No.: US 7,437,496 B2
(45) Date of Patent: Oct. 14, 2008

(54) HOT SWAP ADAPTER

(75) Inventor: Melvin Oster, Newbury Park, CA (US)

(73) Assignee: IXIA, Calabasas, CA (US)

( * ) Notice: Subject to any disclaimer, the term of this patent is extended or adjusted under 35 U.S.C. 154(b) by 222 days.

(21) Appl. No.: 11/380,893

(22) Filed: Apr. 28, 2006

(65) Prior Publication Data

US 2007/0255880 A1 Nov. 1, 2007

(51) Int. Cl.
*G06F 13/00* (2006.01)
(52) U.S. Cl. .................. 710/302; 710/301; 361/728; 361/732; 361/740
(58) Field of Classification Search .......... 710/301, 710/302; 711/115; 361/728, 729, 731, 732, 361/733, 736, 740, 741, 747–749, 759, 760
See application file for complete search history.

(56) References Cited

U.S. PATENT DOCUMENTS

| | | | | |
|---|---|---|---|---|
| 5,579,491 A * | 11/1996 | Jeffries et al. | ................ | 710/302 |
| 5,889,965 A | 3/1999 | Wallach | | |
| 5,996,035 A | 11/1999 | Allen | | |
| 6,223,234 B1 | 4/2001 | Mahalingam | | |
| 6,247,080 B1 | 6/2001 | Wallach | | |
| 6,434,652 B1 * | 8/2002 | Bailis et al. | ................ | 710/302 |
| 6,529,987 B1 * | 3/2003 | Reid | ................ | 710/302 |
| 6,574,695 B1 | 6/2003 | Mott | | |
| 6,658,507 B1 | 12/2003 | Chan | | |
| 6,963,943 B2 | 11/2005 | Wakely | | |
| 6,976,113 B2 | 12/2005 | Krishnamaurthy | | |
| 7,234,971 B2 * | 6/2007 | Chou et al. | ................ | 439/630 |
| 2001/0009501 A1 * | 7/2001 | Nabetani et al. | ........... | 361/684 |
| 2003/0189811 A1 * | 10/2003 | Peeke et al. | ................ | 361/685 |
| 2004/0088604 A1 * | 5/2004 | Bland et al. | ................ | 714/43 |
| 2004/0263471 A1 * | 12/2004 | Hsieh | ................ | 345/156 |
| 2005/0120253 A1 * | 6/2005 | Morrow et al. | ................ | 713/300 |
| 2005/0225950 A1 * | 10/2005 | Matsuda et al. | ................ | 361/737 |
| 2005/0258243 A1 * | 11/2005 | Hsieh | ................ | 235/441 |
| 2006/0206647 A1 * | 9/2006 | Stahl et al. | ................ | 710/301 |
| 2008/0052438 A1 * | 2/2008 | Bennett et al. | ................ | 710/302 |

* cited by examiner

*Primary Examiner*—Glenn A Auve
(74) *Attorney, Agent, or Firm*—SoCal IP Law Group LLP; Steven C. Sereboff; John E. Gunther

(57) ABSTRACT

There is disclosed a hot swap adapter having a circuit board, a power connector, a data connector and a circuit board connector. The circuit board may include one more logic devices. The power connector, the data connector and the circuit board connector may attach to the circuit board. The data connector may interface with a serial bus. The circuit board connector may interface with a parallel bus and a power rail. The logic device may provide a conversion from the serial bus to the parallel bus. The logic device may cause current to stop flowing from the power connector to the power rail in response to an over load condition.

26 Claims, 2 Drawing Sheets

HOT SWAP ADAPTER

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to hot swap adapters.

2. Description of the Related Art

Today's high-end network switches and routers support up to hundreds of network ports and terabits of data throughput capacity. High density test platforms may include up to 240 10/100/1000 Mbps Ethernet or 60-10 Gigabit Ethernet ports capable of Layer 2-7 traffic generation and analysis at up to line rate in a single chassis. A chassis is a mechanical structure to which a backplane, main board, and other electrical equipment are mounted.

Because today's communication systems are operated in the public health, safety and welfare industrial sector, the systems often remain operational for extended period of time without powering down. In order to perform a variety of performance, functional, and conformance testing of networks, applications and systems, modules may be designed in order to be inserted and removed while the system is both powered and operational.

Hot swap functionality refers to the ability to variously install and remove circuit boards, modules, components or other electrical devices to and from a backplane or main board, while a system is operating, without causing an over load condition, a failure or any harm to the electrical devices. Hot swapping is conducted while computing devices are powered and operating without causing operational failure or interruption.

DETAILED DESCRIPTION

Throughout this description, the embodiments and examples shown should be considered as exemplars, rather than limitations on the apparatus and methods disclosed or claimed.

Description of Systems

Figure 1:
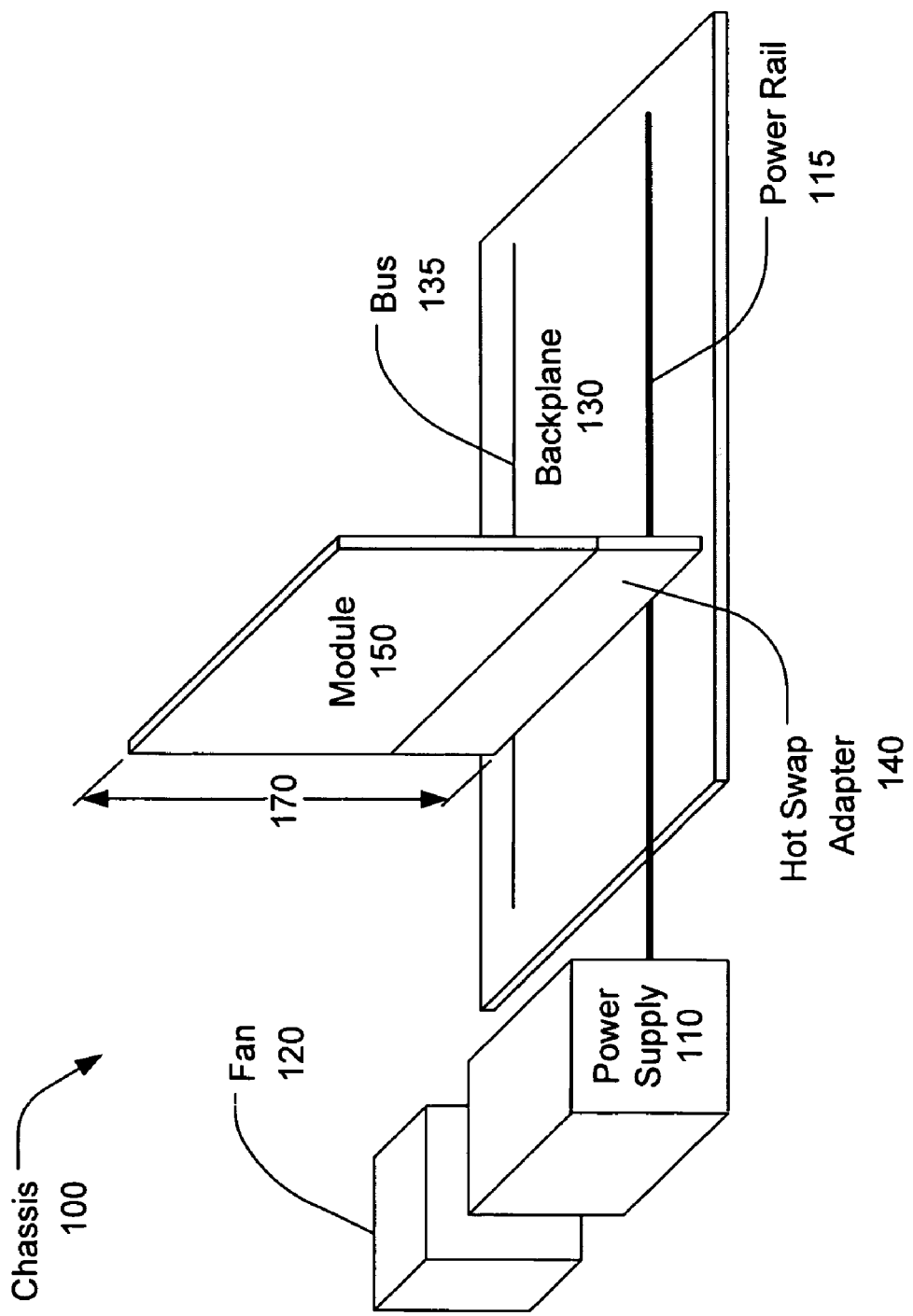
FIG. 1 is a plan view of a chassis.

Referring now to FIG. 1, there is shown a side view of a chassis 100. The chassis 100 includes a power supply 110, a fan 120, a backplane 130, a hot swap adapter 140 and a module 150.

The power supply 110 regulates electric power. The power supply 110 is an electronic device or system that converts electric power from a power source to a form which may be utilized by the fan 120, the backplane 130, the hot swap adapter 140 and the module 150. The power supply 110 may convert power from DC to AC, from DC to DC, or from AC to DC, or other.

The power supply 110 may receive power at a first voltage. Typical input voltages include 12 VDC, 24 VDC and 48 VDC. The power supply 110 may include one or more DC to DC converters which each convert the power to another voltage. Typical output voltages include 12 VDC, 5 VDC, 3.3 VDC, 2.5 VDC, 1.8 VDC and 1.5 VDC. Output voltages from the power supply 110 are provided via one or more of a power rail 115. A power rail is a parallel circuit powered at a predetermined voltage. One or more electrical devices may be connected to the power rail and receive power at the predetermined voltage.

The power supply 110 may power the backplane 130. The backplane 130 provides electrical interconnectivity to multiple circuit boards through a number of similar or identical physical and electrical interfaces. The backplane may include a bus 135, and the circuit boards which connect to the backplane may share the bus. The bus 135 of the backplane 130 may be parallel, serial, bit-serial, high speed, etc. Examples of serial buses include ACCESS bus, Controller Area Network, Serial Peripheral Interface, $I^2C$, Fibre Channel, IEEE 1394, RS-484, Serial ATA, Serial Storage Architecture and Universal Serial Bus.

The backplane 130 may connect a plurality of modules 150. For example, the backplane 130 may provide connection among two, four, eight, sixteen or other number of modules via the bus. The backplane 130 may be passive or active. A passive backplane does not include active bus driving circuitry. In contrast, active backplanes include electrical components which buffer electrical signals to one or more of the plurality of modules.

The backplane 130 may receive power from the power supply 110 via a power rail 115. The backplane 130 may include circuitry to provide hot swap functionality for modules 150 which are to be connected to the backplane 130. Hot swap circuitry may reside on the backplane 130 and/or on one or more of the modules 150.

The module 150 may be an expansion card, a network card, a daughter card or other circuit board. The module 150 may provide a computing device with additional functionality and/or distributed processing relating to a broad range of features. Common modules are specialized for managing data, signals, voice, video, encryption, routing, switching and other functionality. Examples of modules include main boards, graphics cards, sound cards, network cards, television cards, modems, network cards, disk controllers, and test interfaces. Main boards typically include a processor, a memory device and other electronic components and control the functionality of a computing device.

A computing device refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run any operating system, including, for example, variations of the Linux, Unix, MS-DOS, Microsoft Windows, Palm OS, and Apple Mac OS X operating systems.

The backplane 130 may interface with the module 150 via a connector. A connector is an electrical device for joining circuits together. Typically, connectors provide an electrical connection which can be engaged and disengaged. However, some connectors may provide permanent electrical connections. Connectors may also be known as interfaces. Connectors generally have one or more pins or prongs that are inserted into openings or receptacles in a mating socket. A pin is an electrical contact, union or junction of an electrical device. The connection between the mating metal parts must be sufficiently tight to make a good electrical connection and complete a circuit.

As used in this application, the term H-module refers to a module which supports hot swap functionality and the term N-module refers to a module which does not support hot swap functionality on its own. An N-module may be designed to transfer data along a parallel bus to and from a backplane or main board. When an N-module is inserted into a powered and operational backplane 130, the initial transfer of power to the N-module will likely cause circuitry of the N-module to fail and/or become damaged. Such circuitry typically fails due to high magnitude power transfer and/or improper logical sequencing of power transfer to and from the circuitry.

The N-module 150 may align with the hot swap adapter 140 and the backplane 130 via card guides (not shown). Card guides allow for technicians to easily insert and remove modules from a chassis with minimal force. Moreover, card guides assist in proper alignment of connector pins to reduce the risk of shorting circuits, breaking pins and/or bending pins.

The N-module 150 may be connected in-line with the hot swap adapter 140, which in turn is connected to the backplane 130. In-line is an arrangement of one or more devices in at least one straight line. The hot swap adapter 140 provides hot swap functionality to an N-module when coupled between the N-module and another circuit board. The hot swap adapter 140 may be used to convert physical and/or electrical characteristics to provide an operational connection between the backplane 130 and the N-module 150.

The hot swap adapter 140 may have a physical configuration such that when the hot swap adapter 140 is connected to the N-module 150, the combined length is not greater in length than an H-module. For example, if the hot swap adapter 140 and the N-module 150 both are planar, then their combined depth is equal to or less than a P-Module. Therefore, when an N-module 150 and a hot swap adapter 140 are inserted into a backplane 130, the N-module 150 does not extend beyond the opening of the chassis 100.

The physical configuration of hot swap adapter 140 may be selected based on and to accommodate both the depth of the backplane 130 or other main board within the chassis 100, shown in FIG. 1 as depth dimension 170, and the dimensions of the N-module 150.

Some N-modules may be shorter than the depth dimension 170 but too large to fit with a hot swap adapter 140 into the chassis wherein the hot swap adapter 140 is designed with a rigid circuit board. In order to allow such an N-module to be connected to the backplane 130, the hot swap adapter 140 may be designed with a flexible circuit board. With a flexible circuit board, the hot swap adapter 140 may be physically compacted, curled, and/or at least partially folded to reduce the depth of the hot swap adapter 140. Additionally, the hot swap adapter 140 may include a plurality of rigid circuit boards folded together or stacked, and connected via ribbon cables or other electrical connections including a flex circuit.

The hot swap adapter 140 may engage, connect or couple the N-module 150 to the backplane 130. The term engage refers to coming into contact with or interlocking with another device. The hot swap adapter 140 may include one or more connectors or fasteners to provide electrical connections and/or mechanical support between the backplane 130 and the N-module 150.

Figure 2:
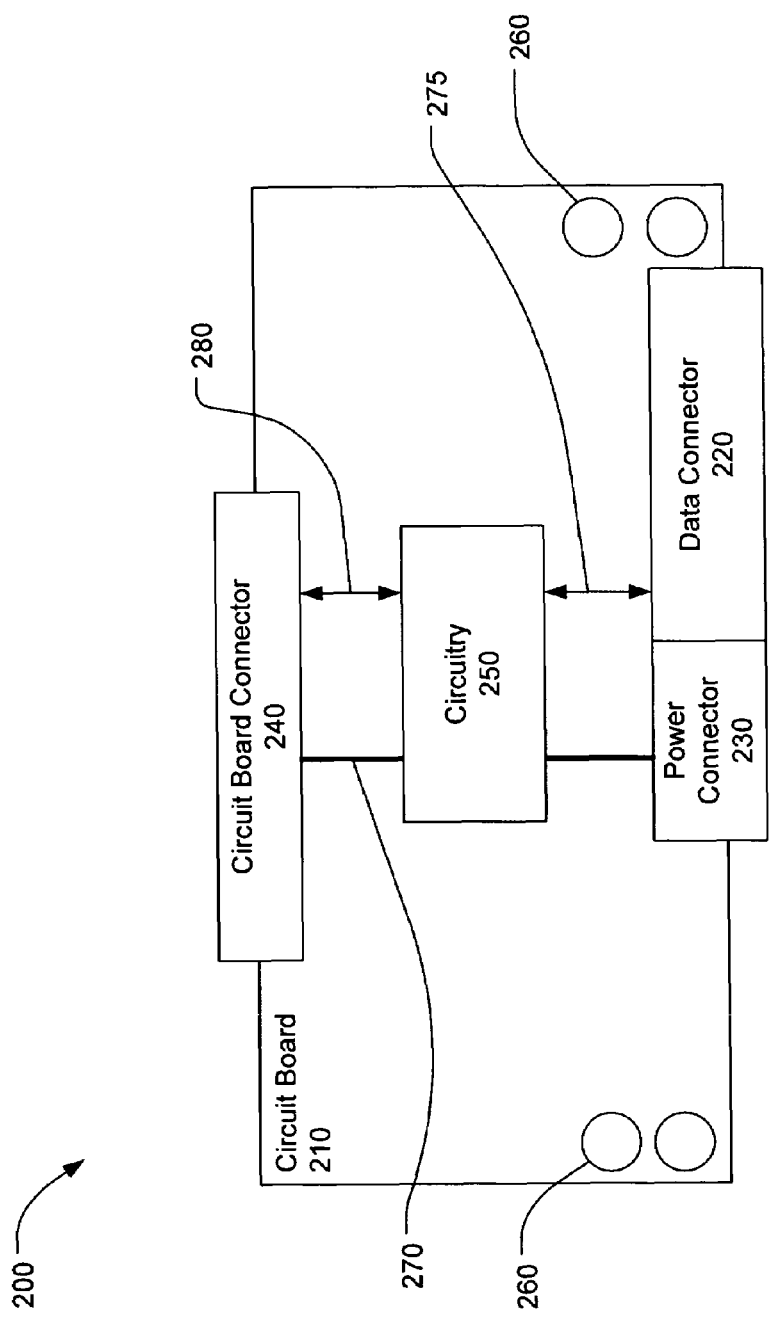
FIG. 2 is a plan view of a hot swap adapter.

Referring now to FIG. 2, there is shown a plan view of a hot swap adapter 200. The hot swap adapter 200 includes a circuit board 210, a data connector 220, a power connector 230, a circuit board connector 240 and a circuitry 250.

The data connector 220 and the power connector 230 may be adapted to connect the circuitry 250 of the circuit board 210 to a backplane or other circuit board. The data connector 220 may be adapted to transmit data via one or more of, individually or in combination, a parallel bus, a serial bus, and a high speed serial bus. The term data refers to one or more of a frame, cell, datagram, packet or other unit of information.

The hot swap adapter 200 may include one or more physical features 260 which provide for the hot swap adapter 200 to be fastened to a backplane or other circuit board. Common fasteners include tabs, screws, snaps, pins, hooks, clamps, couplings, joints, links, ties, catches, keys, latches, pegs, rivets and clips. The physical feature 260 may be a threaded hole, an indent, a depression or other mechanical characteristic which allows for fastening. A fastener may be selected such that when the hot swap adapter 200 is connected to a backplane or other circuit card, a module may be easily disengaged, removed or separated from the circuit board connector 240 without disengaging the hot swap adapter 200 from the backplane or other circuit board. The fastener may provide a connection in a single step without tools, and thereby hold the hot swap adapter 200 securely in the backplane.

The data connector 220 and the power connector 230 may be adapted to attach the hot swap adapter 200 to a backplane with a first frictional force. The circuit board connector 240 may be adapted to attach the hot swap adapter 200 to a module with a second frictional force less than the first frictional force. Therefore, the module may be easily disengaged from the circuit board connector 240 without the data connector 220 or the power connector 230 disengaging from a backplane or other circuit card.

In combination, the data connector 220 and the power connector 230 may define a hot swap connector. In order to sequence the introduction of grounding, identification, powering, and data transmission, the hot swap connector may include staggered pins of varying lengths.

The data connector 220 may include a ground pin which is longer than the other pins. If the data connector 220 has a female structure, for example, a socket, a ground receptacle may protrude beyond the other receptacles. Additionally, the data connector 220 may include a pin which identifies a circuit board as a hot swap adapter 200. The remaining pins may be utilized for passing data signals.

The power connector 230 may include a plurality of pins to control the introduction of power to the hot swap adapter 200. One example of a hot swap power connector may include the following nine pins. The first pin may include a ground pin. The ground pin may provide electrostatic discharge protection. The second pin may provide for precharge or decoupling of capacitors to commence charging. The third pin may provide real time delay. The fourth pin may provide power. The fifth pin may provide functionality to identify that the connector has become seated and to initiate power with the hot swap adapter 200. The sixth pin may allow power to flow to the hot swap adapter 200. The seventh pin may allow another delay. The eighth pin may allow a sequence of power flow to various components on the hot swap adapter 200. The ninth pin may cause normal operation of power flow to the hot swap adapter 200.

The circuit board connector 240 may be adapted to connect the circuitry 250 of the circuit board 210 to an N-module via a parallel bus 280. The circuitry 250 may be adapted to provide a conversion between incompatible buses, such as a serial bus 275 and the parallel bus 280, a high speed serial bus 275 and the parallel bus 280, or a conversion between a combination serial, parallel, and/or high speed serial bus 275 and the parallel bus 280.

The circuitry 250 may be adapted to identify that an N-module has been connected via the circuit board connector 240. The circuitry 250 may be adapted to provide hot swap functionality to an N-module. By providing an N-module with hot swap functionality, the useful life of an N-module may be increased. Moreover, mission critical systems may utilize both H-modules and N-modules with or without a backplane or main board that supports hot swap functionality.

The circuitry 250 is configured to provide for hot swap functionality. Hot swap functionality provides protection to electrical components during power up, for example, when an N-module is coupled to an operating backplane via the hot swap adapter 200. Hot swap functionality facilitates power application to power rails in an appropriate sequence and ramp up.

When an N-module is inserted into an operating backplane, an over load condition commonly causes a failure to one or more of the components of the N-module. An over load condition is one or more of, either individually, or in combination, a predetermined high voltage condition, a predetermined high current condition, or a predetermined high power condition which may cause a failure in an electrical system.

The circuitry 250 may provide the hot swap functionality by detecting whether an N-module is coupled with the hot swap adapter 200 via electrical connection; by monitoring current, voltage, and/or power at a power rail 270 or signal path via one or more sensor; by determining whether an over load condition has occurred with a logic device that has received a signal from the sensor; by the logic device causing a software, digital, semiconductor, analog circuit or mechanical switch to open a circuit to cease power flow through a circuit that has experienced an over load condition; and by allowing for logical power up of the N-module.

For example, a 3.3 VDC power rail may nominally provide 13 amps. However if during a 100 millisecond duration, more than 15.6 amps is provided, the circuitry 250 may identify an over load condition. Another example of an over load condition is when a 5.0 VDC power rail nominally provides 4 amps of power but upon power up, at 0 millisecond duration 5.6 amps of power may cause the circuitry to identify an over load condition. The circuitry may be programmed for a variety of over load conditions based on the characteristics of the modules and the systems.

Logic devices are electrical components that may include one or more of the following: logic arrays, analog circuits, digital circuits, firmware, microprocessors, field programmable gate arrays (FPGAs), application specific integrated circuits (ASICs), programmable logic devices (PLDs) and programmable logic arrays (PLAs).

The sensors which generate signals indicative of current, voltage and/or power may be disposed between the power connector 230 and the circuitry 250 and/or between the circuitry 250 and the circuit board connector 240. Additionally, the sensors may provide the logic device with a signal that indicates a legacy module has been coupled with the circuit board connector 240.

Since various modules and backplanes may transmit data at different rates, the circuitry 250 may utilize buffers. Therefore, the circuitry 250 may temporarily store data received from the data connector via the buffers prior to transmitting the data to the circuit board connector 240. Buffers temporarily store one or more data signals and compensate for differences in the rate of flow of data between components of a data process system.

Referring again to FIG. 1, for ergonomic goals, the chassis 100 and the fan 120 may be designed to limit noise generation to a predetermined value such as 30 dB, 50 dB, 63 dB or other value. The chassis 100 and the fan 120 may be designed to provide airflow to sufficiently cool the modules 150 in order to maximize the life of the modules 150.

Closing Comments

The foregoing is merely illustrative and not limiting, having been presented by way of example only. Although examples have been shown and described, it will be apparent to those having ordinary skill in the art that changes, modifications, and/or alterations may be made.

Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. An apparatus comprising:
   a circuit board having a logic device
   a power connector attached to the circuit board, the power connector is adapted to receive current at a first voltage from a backplane
   a data connector attached to the circuit board, the data connector adapted to interface with a serial bus, the data connector including a pin for identifying the apparatus as a hot swap adapter
   a circuit board connector attached to the circuit board, the circuit board connector adapted to interface with a parallel bus and a power rail
   the logic device adapted to provide a conversion from the serial bus to the parallel bus
   the logic device adapted to cause current to stop flowing from the power connector to the power rail in response to an over load condition.

2. The apparatus of claim 1 wherein the circuit board has a buffer coupled between the logic device and the parallel bus.

3. The apparatus of claim 1 wherein the circuit board is attached to the backplane via a fastener.

4. The apparatus of claim 3 wherein the fastener is selected from the group comprising a tab, a screw, a snap, a pin, a hook, a clamp, a coupling, a joint, a link, a tie, a catch, a key, a latch, a peg, a rivet, and a clip.

5. The apparatus of claim 3 wherein the fastener is a tab.

6. An apparatus, comprising:
a circuit board having a logic device
a power connector attached to the circuit board
a data connector attached to the circuit board, the data connector adapted to interface with a serial bus
a circuit board connector attached to the circuit board, the circuit board connector adapted to interface with a parallel bus and a power rail
the logic device adapted to provide a conversion from the serial bus to the parallel bus
the logic device adapted to cause current to stop flowing from the power connector to the power rail in response to an over load condition,
wherein the circuit board is coupled with a non-hot swappable module via the circuit board connector.

7. The apparatus of claim 6 wherein circuit board and the non-hot swappable module are coupled in-line.

8. An apparatus comprising:
a circuit board having a first connector, a second connector and circuitry
the first connector adapted to attach the circuit board to a backplane with a first frictional force
the second connector adapted to attach the circuit board to a non-hot swappable module with a second frictional force, the second frictional force less than the first frictional force
the circuitry adapted to provide hot swap functionality to the non-hot swappable module.

9. The apparatus of claim 8 wherein the first connector is adapted to connect to a serial bus and the second connector is adapted to connect to a parallel bus.

10. The apparatus of claim 9 wherein the circuitry includes a logic device adapted to cause current to stop flowing to the second connector in response to an over load condition.

11. The apparatus of claim 8 wherein the circuitry includes a logic device adapted to provide a conversion from a serial bus to a parallel bus.

12. The apparatus of claim 11 wherein the circuitry includes a buffer electrically coupled between the logic device and the parallel bus.

13. The apparatus of claim 11 wherein the circuitry includes a current sensor adapted to monitor current flowing to the second connector.

14. The apparatus of claim 13 wherein the circuitry includes a switch adapted to open in response to current flowing to the second connector in an over current state.

15. The apparatus of claim 13 wherein the circuit board is coupled with a backplane via the first connector.

16. The apparatus of claim 8 wherein the circuit board is coupled in-line with the non-hot swappable module.

17. An apparatus comprising:
a circuit board having a first connector, a second connector and circuitry
the first connector adapted to engage the circuit board to a backplane
a second connector adapted to engage the circuit board to a non-hot swappable module
the circuitry adapted to provide hot swap functionality to the module
the circuit board adapted to receive a fastener, wherein the fastener is adapted to prevent the circuit board from disengaging from the backplane when the module is disengaging from the second connector.

18. The apparatus of claim 17 wherein the fastener is selected from the group comprising a tab, a screw, a snap, a pin, a hook, a clamp, a coupling, a joint, a link, a tie, a catch, a key, a latch, a peg, a rivet, and a clip.

19. The apparatus of claim 17 wherein the fastener is a latch.

20. The apparatus of claim 17 wherein the first connector is coupled to a serial bus of the backplane and the second connector is coupled to a parallel bus of the module.

21. The apparatus of claim 17 wherein the circuitry includes a logic device adapted to provide a conversion from a serial bus to a parallel bus.

22. The apparatus of claim 21 wherein the circuitry includes a buffer electrically coupled between the logic device and the parallel bus.

23. The apparatus of claim 17 wherein the circuitry includes a logic device adapted to cause current to stop flowing to the second connector in response to an over load condition.

24. The apparatus of claim 23 wherein the circuitry includes a current sensor adapted to monitor current flowing to the second connector.

25. The apparatus of claim 24 wherein the circuitry includes a switch adapted to open in response to current flowing to the second connector in an over current state.

26. The apparatus of claim 17 wherein the circuit board is in-line with the module.

* * * * *